US012062858B2

(12) United States Patent
Ayala Vazquez et al.

(10) Patent No.: US 12,062,858 B2
(45) Date of Patent: Aug. 13, 2024

(54) ELECTRONIC DEVICE WITH SWITCHABLE ANTENNA LOOP PATH

(71) Applicant: Apple Inc., Cupertino, CA (US)

(72) Inventors: Enrique Ayala Vazquez, Watsonville, CA (US); Yuancheng Xu, San Jose, CA (US); Hongfei Hu, Cupertino, CA (US); Hao Xu, Cupertino, CA (US); Yiren Wang, Cupertino, CA (US); Han Wang, Campbell, CA (US); Sidharath Jain, Cupertino, CA (US); Nikolaj Peter Iversen Kammersgaard, Mountain View, CA (US); Haozhan Tian, San Jose, CA (US); Yuan Tao, Santa Clara, CA (US); Carlo Di Nallo, Belmont, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 17/849,501

(22) Filed: Jun. 24, 2022

(65) Prior Publication Data

US 2023/0420840 A1 Dec. 28, 2023

(51) Int. Cl.
*H01Q 3/24* (2006.01)
*H01Q 1/24* (2006.01)
*H01Q 5/364* (2015.01)

(52) U.S. Cl.
CPC ............. *H01Q 3/247* (2013.01); *H01Q 1/243* (2013.01); *H01Q 5/364* (2015.01)

(58) Field of Classification Search
USPC ........................................................... 343/702
See application file for complete search history.

(56) References Cited

U.S. PATENT DOCUMENTS

| | | | | |
|---|---|---|---|---|
| 9,070,968 | B2 * | 6/2015 | Mow | H01Q 9/0421 |
| 10,847,901 | B1 * | 11/2020 | Ayala Vazquez | H01Q 1/521 |
| 10,916,832 | B2 * | 2/2021 | Azad | H01Q 21/28 |
| 10,944,153 | B1 * | 3/2021 | Yarga | H01Q 5/30 |
| 11,024,947 | B2 * | 6/2021 | Jung | H04M 1/026 |
| 11,205,834 | B2 * | 12/2021 | Ayala Vazquez | H01Q 1/243 |
| 11,322,840 | B2 * | 5/2022 | Wang | H01Q 5/28 |
| 2012/0229347 | A1 * | 9/2012 | Jin | H01Q 21/28 343/702 |

(Continued)

*Primary Examiner* — Hoang V Nguyen
*Assistant Examiner* — Brandon Sean Woods
(74) *Attorney, Agent, or Firm* — Treyz Law Group, P.C.; Michael H. Lyons

(57) ABSTRACT

An electronic device may be provided with peripheral conductive housing structures having first and second segments. The device may include an antenna having a resonating arm formed from the first segment, an antenna ground, and a tuning element. The tuning element may have first, second, and third terminals. The first terminal may be coupled to the second segment. The antenna may have a switchable loop path that includes a first path from the second terminal to the first segment, a second path from first segment to a first point on the antenna ground, a portion of the antenna ground from the first point to a second point, and a third path from the second point to the third terminal. The tuning element may selectively activate the switchable loop path to boost performance of the antenna in a frequency band between 3300 MHz and 5000 MHz when needed.

20 Claims, 7 Drawing Sheets

(56) References Cited

U.S. PATENT DOCUMENTS

| | | | | |
|---|---|---|---|---|
| 2021/0399406 | A1* | 12/2021 | Tsai | H01Q 21/28 |
| 2022/0102852 | A1* | 3/2022 | Irci | H04M 1/026 |
| 2022/0166448 | A1* | 5/2022 | Nakai | H01Q 1/521 |

* cited by examiner

ELECTRONIC DEVICE WITH SWITCHABLE ANTENNA LOOP PATH

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

SUMMARY

An electronic device may be provided with wireless circuitry and a housing having peripheral conductive housing structures. A dielectric gap may divide the peripheral conductive housing structures into first and second segments. The first and second segments may be separated from an antenna ground by a slot.

The wireless circuitry may include an antenna. The antenna may have a resonating element arm formed from the first segment. The antenna may have a tuning element. The tuning element may have first, second, and third terminals. The first terminal may be coupled to the second segment. The antenna may have a switchable loop path. The switchable loop path may include a first conductive path extending from the second terminal to a first point on the first segment across the gap. The switchable loop path may include a second conductive path extending from the first point to a second point on the antenna ground across the slot. The switchable loop path may include a portion of the antenna ground extending from the second point to a third point on the antenna ground. The switchable loop path may include a third conductive path extending from the third point to the third terminal across the slot. The switchable loop path may extend from the third terminal to the second segment through the first terminal. The tuning element may be controlled to selectively activate the switchable loop path to boost performance of the antenna in a frequency band between 3300 MHz and 5000 MHz.

DETAILED DESCRIPTION

Figure 1:
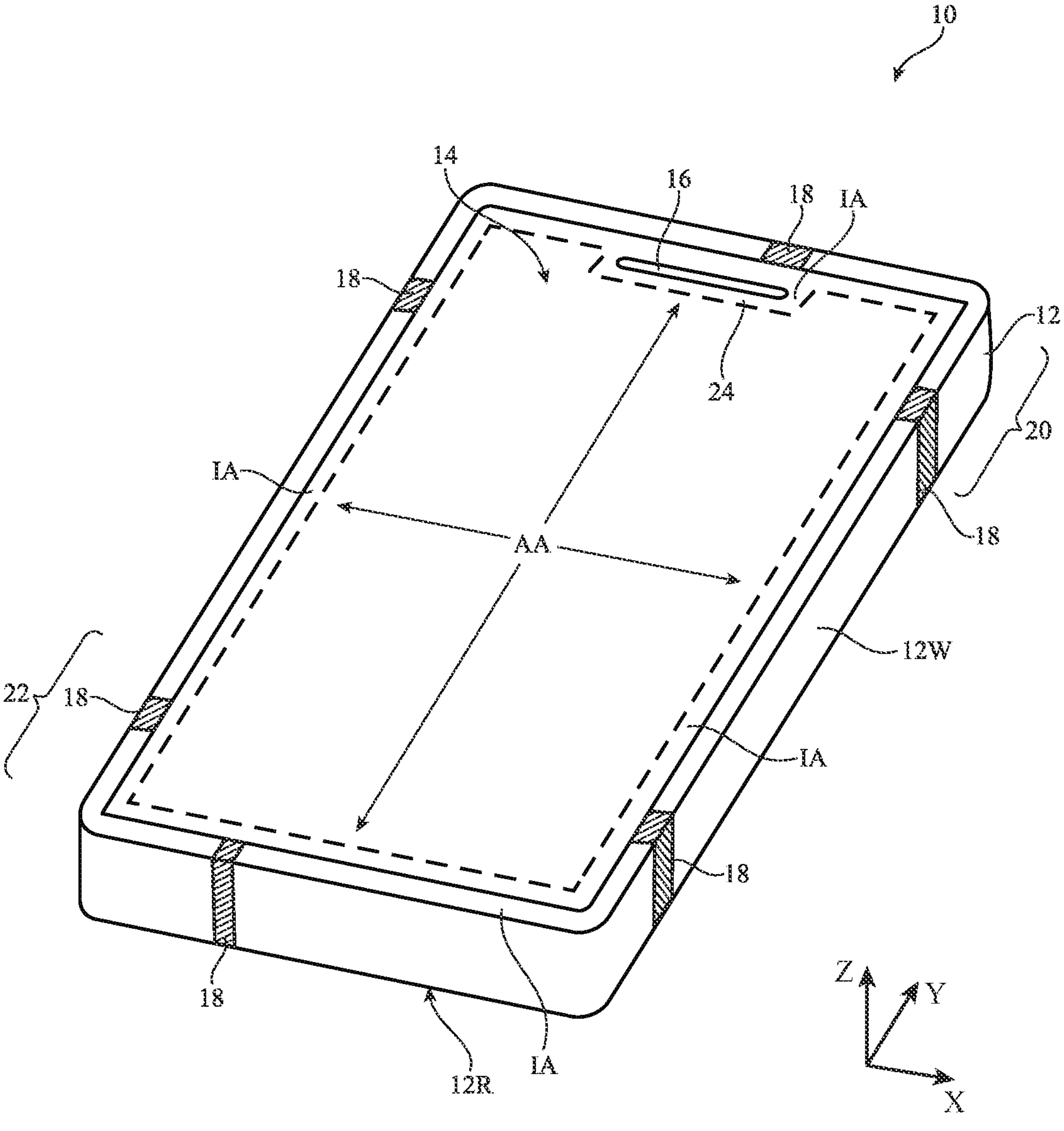
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
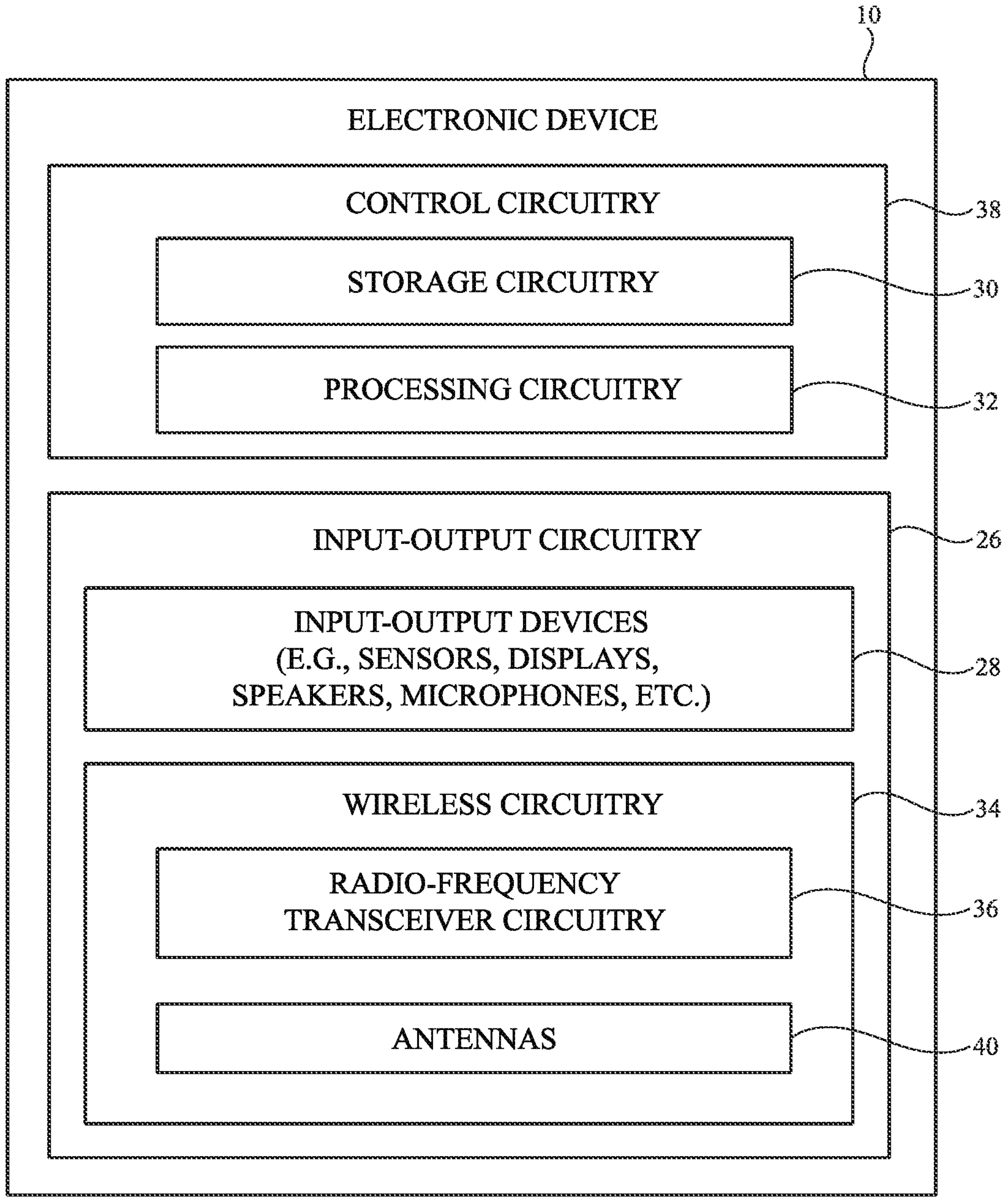
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
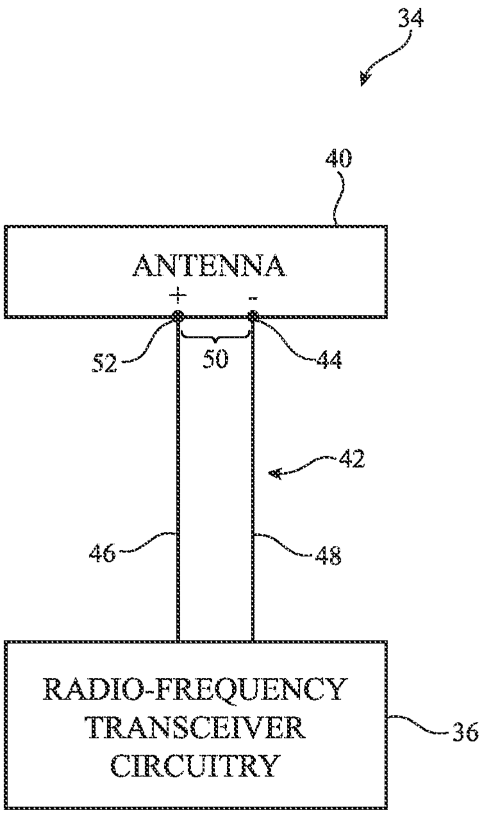
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include an antenna resonating (radiating) element and an antenna ground. Antenna feed 50 may include a positive antenna feed terminal 52 coupled to the antenna resonating element and a ground antenna feed terminal 44 coupled to the antenna ground.

Radio-frequency transceiver circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
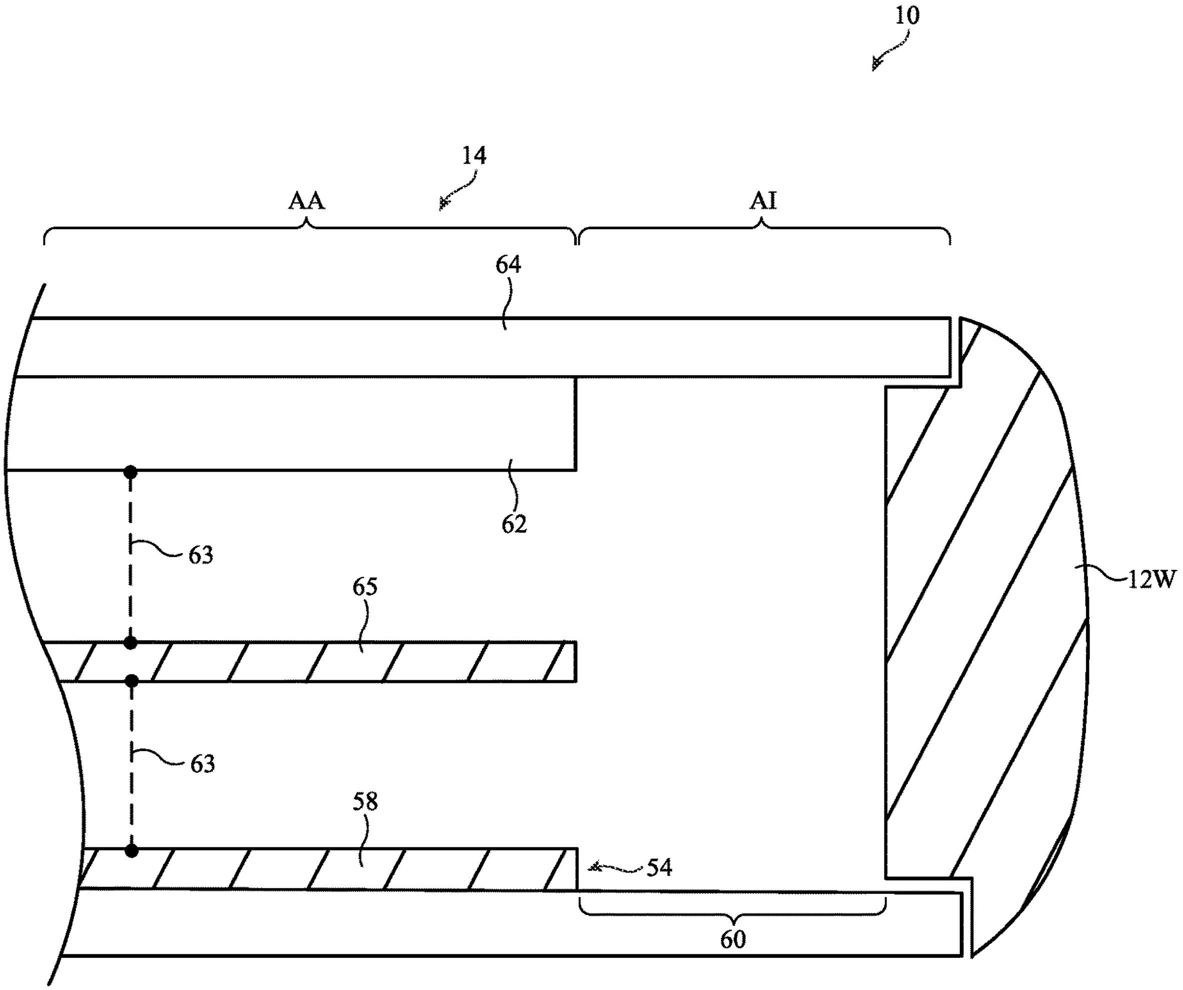
FIG. 4 is a cross-sectional side view of an electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may be formed from an integral portion of peripheral conductive housing structures 12W that extends across the width of device 10 or may include a separate housing structure attached, coupled, or affixed to peripheral conductive housing structures 12W.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

The housing for device 10 may also include one or more additional conductive support plates interposed between display 14 and rear housing wall 12R. For example, the housing for device 10 may include a conductive support plate such as mid-chassis 65 (sometimes referred to herein as conductive support plate 65). Mid-chassis 65 may be vertically interposed between rear housing wall 12R and display 14 (e.g., conductive support plate 58 may be located at a first distance from display 14 whereas mid-chassis 65 is located at a second distance that is less than the first distance from display 14). Mid-chassis 65 may extend across an entirety of the width of device 10 (e.g., between the left and right edges of device 10 as shown in FIG. 1). Mid-chassis may be formed from an integral portion of peripheral conductive housing structures 12W that extends across the width of device 10 or may include a separate housing structure attached, coupled, or affixed to peripheral conductive housing structures 12W. One or more components may be supported by mid-chassis 65 (e.g., logic boards such as a main logic board, a battery, etc.) and/or mid-chassis 65 may contribute to the mechanical strength of device 10. Mid-chassis may be formed from metal (e.g., stainless steel, aluminum, etc.).

Conductive support plate 58, mid-chassis 65, and/or display module 62 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive housing structures such as conductive support plate 58, mid-chassis 65, conductive portions of display module 62, and/or peripheral conductive housing structures 12W (e.g., the portion of peripheral conductive housing structures 12W opposite conductive support plate 58, mid-chassis 65, and display module 62 at slot 60) may be used to form antenna structures for one or more of the antennas 40 in device 10. For example, peripheral conductive housing structures 12W may form an antenna resonating element arm (e.g., an inverted-F antenna resonating element arm) for one or more of the antennas 40 in device 10. Mid-chassis 65, conductive support plate 58, and/or display module 62 may be used to form the corresponding antenna ground for one or more of the antennas 40 in device 10 and/or to form one or more edges of slot antenna resonating elements (e.g., slot antenna resonating elements formed from slot 60) for the antennas 40 in device 10. One or more conductive interconnect structures 63 may electrically couple mid-chassis 65 to conductive support plate 58 and/or one or more conductive interconnect structures 63 may electrically couple mid-chassis 65 to conductive structures in display module 62 (sometimes referred to herein as conductive display structures) so that each of these elements form part of the antenna ground. The conductive display structures may include a conductive frame, bracket, or support for display module 62, shielding layers in display module 62, ground traces in display module 62, etc.

Conductive interconnect structures 63 may serve to ground mid-chassis 65 to conductive support plate 58 and/or display module 62 (e.g., to ground conductive support plate 58 to the conductive display structures through mid-chassis 65). Put differently, conductive interconnect structures 63 may hold the conductive display structures, mid-chassis 65, and/or conductive support plate 58 to a common ground or reference potential (e.g., as a system ground for device 10 that is used to form part of the antenna ground). Conductive interconnect structures 63 may therefore sometimes be referred to herein as grounding structures 63, grounding interconnect structures 63, or vertical grounding structures 63. Conductive interconnect structures 63 may include conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65 and/or conductive support plate 58, and/or any other desired conductive interconnect structures.

Figure 5:
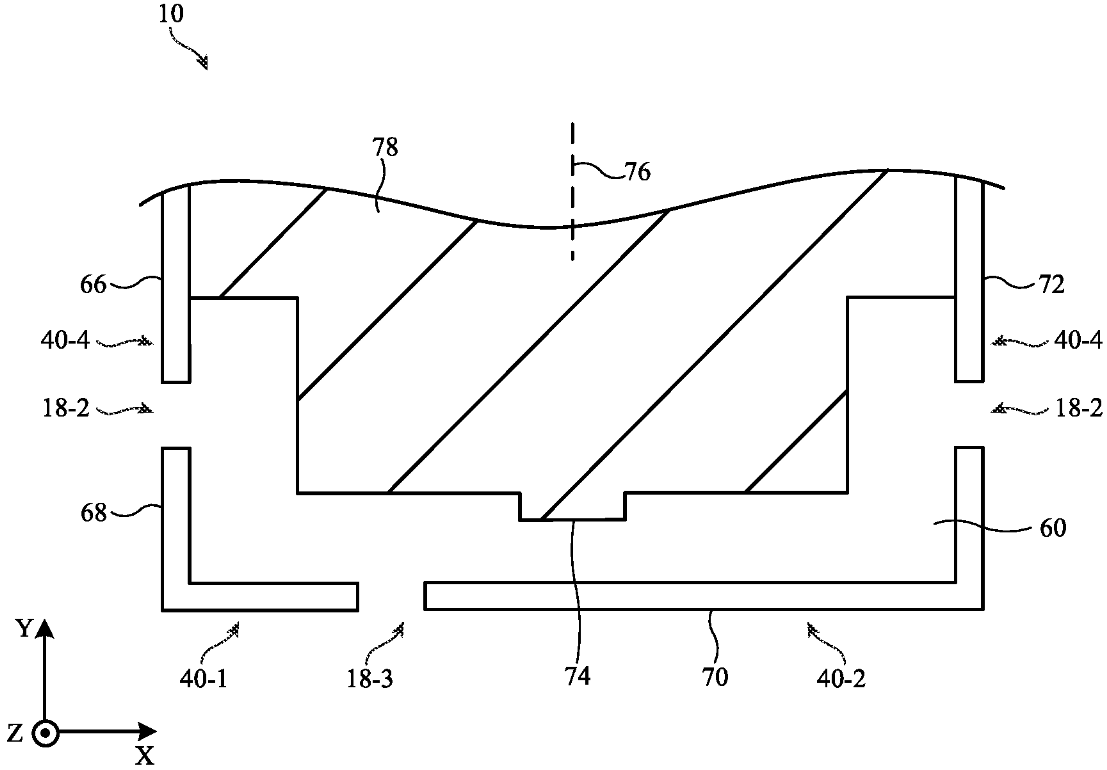
FIG. 5 is a top interior view of the lower end of an illustrative electronic device having peripheral conductive housing structures with dielectric gaps for forming one or more antenna resonating elements in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how the lower end of device 10 (e.g., within region 22 of FIG. 1) may include a slot 60 and may include multiple dielectric gaps that divide the peripheral conductive housing structures into segments for forming multiple antennas. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10 (not shown in FIG. 5), a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 66 of peripheral conductive housing structures 12W from segment 68 of peripheral conductive housing structures 12W. Gap 18-2 may divide the third conductive sidewall to separate segment 72 from segment of peripheral conductive housing structures 12W. Gap 18-3 may divide the fourth conductive sidewall to separate segment 68 from segment 70 of peripheral conductive housing structures 12W. In this example, segment 68 forms the bottom-left corner of device 10 (e.g., segment 68 may have a bend at the corner) and is formed from the first and fourth conductive sidewalls of peripheral conductive housing structures 12W (e.g., in lower region 22 of FIG. 1). Segment 70 forms the bottom-right corner of device 10 (e.g., segment 70 may have a bend at the corner) and is formed from the third and fourth conductive sidewalls of peripheral conductive housing structures 12W (e.g., in lower region 22 of FIG. 1).

Device 10 may include ground structures 78 (e.g., structures that form part of the antenna ground for one or more of the antennas in device 10). Ground structures 78 may include one or more metal layers such conductive support plate 58 (FIG. 4), mid-chassis 65 (FIG. 4), conductive display structures, conductive interconnect structures 63 (FIG. 4), conductive traces on a printed circuit board, conductive portions of one or more components in device 10, etc. Ground structures 78 may extend between opposing sidewalls of peripheral conductive housing structures 12W. For example, ground structures 78 may extend from segment 66 to segment 72 of peripheral conductive housing structures 12W (e.g., across the width of device 10, parallel to the X-axis of FIG. 5). Ground structures 78 may be welded or otherwise affixed to segments 66 and 72. In another suitable arrangement, some or all of ground structures 78, segment 66, and segment 72 may be formed from a single, integral (continuous) piece of machined metal (e.g., in a unibody configuration). Ground structures 78 may include a ground extension 74 that protrudes into slot 60 and that may, if desired, bridge slot 60 and couple the ground structures to the peripheral conductive housing structures. Ground extension 74 may be formed from a data connector for device 10. Device 10 may have a longitudinal axis 76 that bisects the width of device 10 and that runs parallel to the length of device 10 (e.g., parallel to the Y-axis).

As shown in FIG. 5, slot 60 may separate ground structures 78 from segments 68 and 70 of peripheral conductive housing structures 12W (e.g., the upper edge of slot 60 may be defined by ground structures 78 whereas the lower edge of slot 60 is defined by segments 68 and 70). Slot 60 may have an elongated shape extending from a first end at gap 18-1 to an opposing second end at gap 18-2 (e.g., slot 60 may span the width of device 10). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

Ground structures 78, segment 66, segment 68, segment 70, and portions of slot 60 may be used in forming multiple antennas 40 in the lower region of device 10 (sometimes referred to herein as lower antennas). For example, device 10 may include a first antenna 40-1 having an antenna resonating (radiating) element formed from segment 68 and having an antenna ground formed from ground structures 78, device 10 may include a second antenna 40-2 having an antenna resonating element formed from segment 70 and having an antenna ground formed from ground structures 78, may have a third antenna 40-3 having a slot antenna resonating element formed from a portion of slot 60 between segment 66 and ground structures 78, and may have a fourth antenna 40-4 having a slot antenna resonating element formed from a portion of slot 60 between segment 72 and ground structures 78. Antennas 40-1 and 40-2 may be, for example, inverted-F antennas having a return path that couples the respective resonating element arms to the antenna ground. Antennas 40-1, 40-2, 40-3, and 40-4 may convey radio-frequency signals in one or more frequency bands. For example, antennas 40-1 and 40-2 may convey radio-frequency signals in at least the cellular low band, the cellular midband, and the cellular high band. This may allow antennas 40-1 and 40-2 to perform MIMO communications in one or more of these bands, thereby maximizing data throughput.

Figure 6:
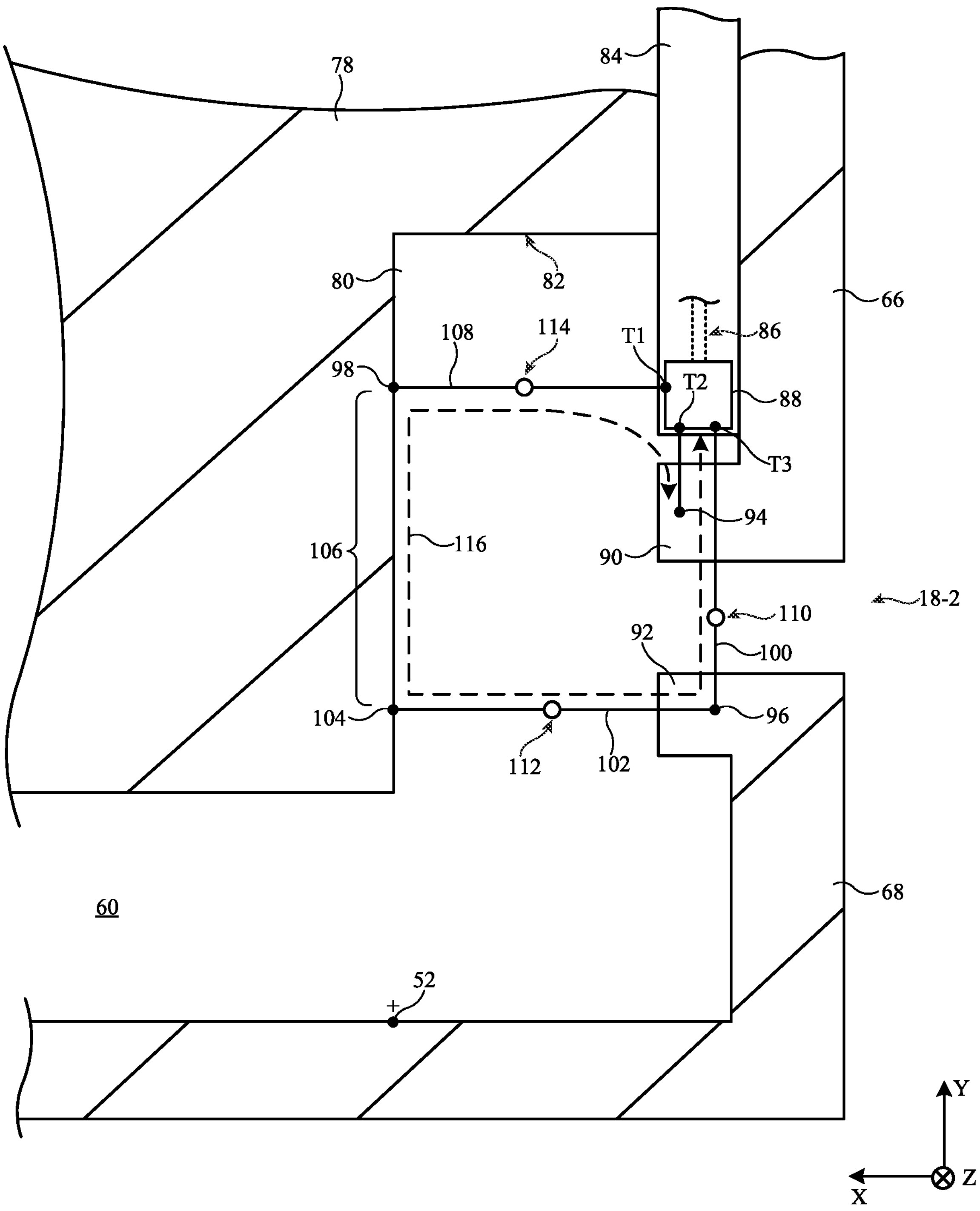
FIG. 6 is a rear interior view of the lower end of an illustrative electronic device having an antenna with a switchable loop path in accordance with some embodiments.

Antenna 40-1 may occupy a much smaller volume in device 10 than antenna 40-2. It can therefore be difficult for antenna 40-1 to cover all frequencies of one or more frequency bands of interest with satisfactory antenna efficiency. If desired, antenna 40-1 may include a switchable loop path that helps to configure antenna 40-1 to cover all frequencies of one or more frequency bands of interest with satisfactory antenna efficiency. FIG. 6 is an interior rear view showing how antenna 40-1 may include a switchable loop path (e.g., with dielectric cover layer 56 of FIG. 4 removed).

As shown in FIG. 6, antenna 40-1 may have an antenna resonating element arm formed from segment 68 of peripheral conductive housing structures 12W. Segment 68 may, for example, form an inverted-F antenna resonating element arm for antenna 40-1. Antenna 40-1 may be fed using an antenna feed (e.g., antenna feed 50 of FIG. 3) coupled across slot 60. The antenna feed may have positive antenna feed terminal 52 coupled to segment 68 of peripheral conductive housing structures 12W. In some implementations, positive antenna feed terminal 52 may also be switchably coupled to a point on segment 66 to directly feed segment 66. More than one positive antenna feed terminal 52 may be coupled to different points on segment 68 if desired (e.g., positive antenna feed terminals coupled to different respective radio-frequency transmission line paths). If desired, antenna 40-1 may have one or more return paths and/or antenna tuning components (e.g., switchable capacitors, inductors, etc.) coupled between segment 68 and ground structures 78.

Slot 60 may include a vertical portion that extends parallel to longitudinal axis 76 (FIG. and beyond gap 18-2. As shown in FIG. 6, slot 60 may include an extended (elongated) portion 80. Extended portion 80 of slot 60 may extend between segment 66 and ground structures 78 (e.g., segment 66 and ground structures 78 may define opposing edges of extended portion 126), parallel to longitudinal axis (the Y-axis in FIG. 6). Extended portion 80 of slot 60 may have an open end at gap 18-2 and an opposing closed end 82 formed from ground structures 78. Extended portion 80 of slot 60 may sometimes be referred to herein simply as slot 80. Slot 80 may contribute to the frequency response of antenna 40-1.

To selectively boost the frequencies covered by antenna 40-1, antenna 40-1 may include a switchable loop path. As shown in FIG. 6, antenna 40-1 may include an antenna tuning element 88 that is used to form the switchable loop path. Tuning element 88 may be mounted to an underlying substrate such as flexible printed circuit 84. Tuning element 88 may, for example, be surface-mounted to flexible printed circuit 84 (e.g., using solder) as a surface-mount technology (SMT) component. Tuning element 88 may sometimes be referred to herein as antenna tuning element 88, tuning circuit 88, tuning component 88, switchable component 88, switching circuitry 88, or simply as tuner 88.

Flexible printed circuit 84 may run along the interior surface of segment 66 (e.g., under a ledge or datum of segment 66). Flexible printed circuit 84 may include conductive traces 86. Tuning element 88 may be interposed along or otherwise coupled to conductive traces 86. Conductive traces 86 may include ground traces, control traces, and/or signal traces. The signal traces may convey radio-frequency signals for a corresponding radio-frequency transmission line path. The ground traces may be coupled to the antenna ground for antenna 40-1 (e.g., ground structures 78). The control traces may include one or more control paths that convey control signals for tuning element 88 (e.g., from control circuitry 38 of FIG. 2). The control signals may adjust the tuning state of tuning element 88 (e.g., between two or more tuning states).

Tuning element 88 may have a first terminal (port) T1, a second terminal (port) T2, and a third terminal (port) T3. Tuning element 88 may include one or more inductors, resistors, capacitors, and/or switches coupled between conductive traces 86 and/or terminals T1, T2, and/or T3 in any desired manner. The control signals provided over the control trace(s) in conductive traces 86 may dynamically change, adjust, or switch the tuning state of element 88 by controlling the switch(es) in tuning element 88 (e.g., to couple different complex impedances between any combination of terminals T1-3 and/or conductive traces 86). The control signals may also adjust the inductance of one or more tunable inductors and/or adjust the capacitance of one or more tunable capacitors (e.g., varactors) in tuning element 88.

As shown in FIG. 6, terminal T2 of tuning element 88 may be coupled to point 94 on segment 66 of peripheral conductive housing structures 12W. Point 94 may be located at or adjacent to gap 18-2 (e.g., on knuckle 90 of segment 66). Terminal T3 of tuning element 88 may be coupled to point 96 on segment 68 over conductive path 100 (e.g., terminal T3 of tuning element 88 may be coupled to segment 66 across gap 18-2). Point 96 may be located at or adjacent to gap 18-2 (e.g., on knuckle 92 of segment 68). Terminal T1 of tuning element 88 may be coupled to point 98 on ground structures 78 over conductive path 108 (e.g., terminal T1 of tuning element 88 may be coupled to ground structures 78 across slot 80).

Point 96 on segment 68 may also be coupled to point 104 on ground structures 78 over conductive path 102 (e.g., across slot 60). Point 104 may be separated from point 98 by portion 106 of ground structures 78 (e.g., along the edge of ground structures 78 defining slot 60). Conductive screws, conductive adhesive, solder, welds, conductive clips, conductive pins, conductive springs, conductive brackets, and/or any other desired conductive interconnect structures may be used to couple conductive path 102 to points 96 or 104, to couple conductive path 100 to terminal T3 or point 96, to couple terminal T2 to point 94, and/or to couple conductive path 108 to point 98 or terminal T1.

Conductive paths 100, 102, and 108 may include conductive traces (e.g., on one or more underlying flexible printed circuits or other substrates), wires, and/or any other desired conductive interconnect structures. If desired, an antenna tuning element 110 may be disposed on conductive path 100. Additionally or alternatively, an antenna tuning element 112 may be disposed on conductive path 102. Additionally or alternatively, an antenna tuning element 114 may be disposed on conductive path 108. Antenna tuning elements 110, 112, and/or 114 may include any desired inductors, resistors, capacitors, and/or switches arranged in any desired manner. As one example, antenna tuning elements 114 and 112 may each include single-pole three-throw (SP3T) switches and corresponding inductors (e.g., switchable inductors) whereas antenna tuning element 110 includes a single-pole single-throw (SPST) switch. Antenna tuning elements 110, 112, and/or 114 may be adjusted (e.g., using control signals) to adjust the electrical length of loop path 116, thereby tuning the frequency response of the antenna in one or more desired frequency bands. Antenna tuning elements 110, 112, and/or 114 may be omitted. If desired, point 94 may be coupled to positive antenna feed terminal 52 over a corresponding conductive path and antenna tuning element (not shown).

In some implementations that are described herein as examples, tuning element 88 may include an SP3T coupled between terminals T1-T3 and/or ground traces in conductive traces 86. The SP3T may include three field-effect transistors (FETs), for example. Tuning element 88 may have a first tuning state (e.g., a state in which each FET is turned on or provided with an asserted gate voltage so current flows between its source/drain terminals). When tuning element 88 is in the first tuning state, an antenna loop path is switched into use and incorporated into the resonating element arm of antenna 40-1. In this first tuning state, tuning element 88 may form a loop path from terminal T3 (or from ground traces on flexible printed circuit 84 to terminal T3), through conductive path 100 to point 96 on segment 68 (e.g., across gap 18-2), through conductive path 102 from point 96 to point 104 (e.g., across slot 60), from point 104 to point 98 through portion 106 of ground structures 78, from point 98 to terminal T1 (e.g., across slot 80), from terminal T1 to terminal T2, and from terminal T2 to point 94 on segment 66, as shown by arrow 116. Arrow 116 may therefore sometimes be referred to herein as loop path 116, antenna loop path 116, switchable loop path 116, or switchable antenna loop path 116.

When tuning element 88 is in the first tuning state (mode), loop path 116 is formed (e.g., switched into use) within antenna 40-1 and corresponding antenna currents flow along loop path 116. Loop path 116 may contribute an additional resonance to antenna 40-1 (e.g., to the resonance of slot 60, slot 80, segment 66, and/or segment 68) that serves to boost the antenna efficiency of antenna 40-1 at one or more frequencies, such as in the cellular UHB between 3300 MHz and 5000 MHz (e.g., in a fundamental and/or one or more harmonic modes of the loop path). Tuning element 88 may also have a second tuning state (mode) in which loop path 116 is decoupled from antenna 40-1 (e.g., switched out of use) and no longer contributes a radiative response for the antenna (e.g., by forming infinite or open circuit impedances at one or more of terminals T1-T3). The control signals on conductive traces 86 may place tuning element 88 into the first tuning state when radio-frequency signals are conveyed in the frequency band covered by loop path 116 (e.g., between 3300 MHz and 5000 MHz) and may place tuning element 88 into the second tuning state when this coverage is not needed, for example. The example of FIG. 6 is merely illustrative. Loop path 116 and the other structures of antenna 40-1 may have other shapes.

Figure 7:
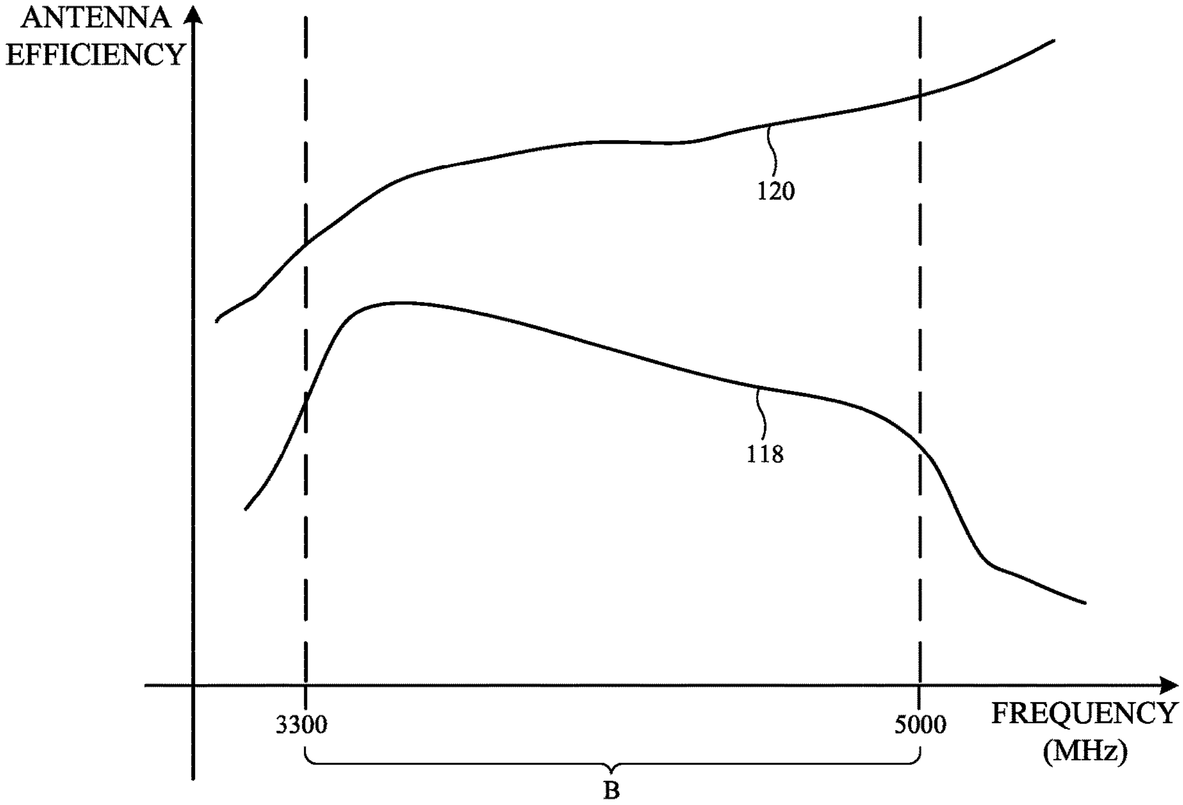
FIG. 7 is a plot showing how an illustrative antenna of the type shown in FIG. 6 may use a switchable loop path to optimize performance in a given frequency band in accordance with some embodiments.

FIG. 7 is a plot showing how tuning element 88 and loop path 116 may boost performance of antenna 40-1 in a corresponding frequency band B. Curve 118 plots the antenna efficiency of antenna 40-1 when tuning element 88 is in the second tuning state or in implementations where loop path 116 (e.g., tuning element 88, conductive path 108, conductive path 100, and/or conductive path 102) is omitted. As shown by curve 118, antenna 40-1 may exhibit a relatively low antenna efficiency across frequency band B in these scenarios. Frequency band B may be, for example, the cellular UHB (e.g., 3300-5000 MHz).

Curve 120 plots the antenna efficiency of antenna 40-1 when tuning element 88 is in the first tuning state, where loop path 116 is coupled between point 94 and terminal T3 of tuning element 88 in antenna 40-1 (e.g., across slot 60, slot 80, and gap 18-2 between segments 66 and 68). As shown by curve 120, antenna 40-1 may exhibit a relatively high antenna efficiency across frequency band B when antenna 40-1 has been configured by tuning element 88 to include loop path 116. The example of FIG. 7 is merely illustrative. In practice, curves 118 and 120 may have other shapes. Frequency band B may include any desired frequencies.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

ground structures;

peripheral conductive housing structures having a first segment and a second segment separated from the first segment by a dielectric-filled gap, the first and second segments being separated from the ground structures by a slot;

an antenna feed terminal on the first segment;

a tuning element having a first terminal coupled to the second segment and having a second terminal and a third terminal;

a first conductive path that couples the second terminal to a first point on the first segment across the dielectric-filled gap;

a second conductive path that couples the first point to a second point on the ground structures across the slot; and a third conductive path that couples the third terminal to a third point on the ground structures across the slot, the third point being separate from the second point.

2. The electronic device of claim 1, further comprising:

a flexible printed circuit that runs along the second segment, the tuning element being mounted to the flexible printed circuit.

3. The electronic device of claim 2, further comprising conductive traces on the flexible printed circuit and coupled to the tuning element.

4. The electronic device of claim 1, wherein the tuning element comprises a single-pole three-throw (SP3T) switch.

5. The electronic device of claim 1, wherein the tuning element has a first state in which the first terminal is coupled to the third terminal.

6. The electronic device of claim 5, wherein the tuning element has a second state in which the first terminal is decoupled from the third terminal.

7. The electronic device of claim 1, wherein the slot has an extended portion extending beyond the dielectric-filled gap, the third conductive path being coupled across the extended portion of the slot.

8. The electronic device of claim 1, wherein antenna currents flowing through the first conductive path, the second conductive path, a portion of the ground structures extending between the second and third points, and from the third terminal to the first terminal are configured to radiate radio-frequency signals at a frequency between 3300 MHz and 5000 MHz.

9. The electronic device of claim 1, further comprising:

a display mounted to the peripheral conductive housing structures and having conductive display structures;

a rear housing wall opposite the display and having a conductive support plate;

a mid-chassis between the display and the conductive support plate; and conductive interconnect structures that couple the conductive display structures to the mid-chassis and that couple the mid-chassis to the conductive support plate, wherein the ground structures comprise the conductive display structures, the conductive support plate, the mid-chassis, and the conductive interconnect structures.

10. An electronic device comprising:

peripheral conductive housing structures having a dielectric-filled gap that divides the peripheral conductive housing structures into a first segment and a second segment; and an antenna having an antenna ground separated from the first and second segments by a slot, a resonating element arm formed from the first segment, and a switchable loop path that includes a first conductive path coupled across the dielectric-filled gap, a second conductive path coupled across the slot, a third conductive path coupled across the slot, and a portion of the antenna ground extending from the second conductive path to the third conductive path.

11. The electronic device of claim 10, wherein the second conductive path is coupled between the first segment and the antenna ground and the third conductive path is coupled between the second segment and the antenna ground.

12. The electronic device of claim 11, wherein the first conductive path is coupled to a first point on the first segment, the second conductive path is coupled between the first point and a second point on the antenna ground, and the third conductive path is coupled between the second segment and a third point on the antenna ground.

13. The electronic device of claim 10, further comprising:

a switchable component having a first terminal coupled to the second segment, a second terminal coupled to the first conductive path, and a third terminal coupled to the third conductive path.

14. The electronic device of claim 13, wherein the switchable component has a first state and a second state, the switchable loop path contributing more to a radiative response of the antenna in the first state than in the second state.

15. The electronic device of claim 13, further comprising:

a printed circuit running along the second segment, wherein the switchable component is surface-mounted to the printed circuit.

16. The electronic device of claim 13, wherein the switchable loop path extends from the third terminal to the second segment through the first terminal.

17. An antenna comprising:

an antenna ground;

a resonating element arm;

a feed terminal coupled to the resonating element arm;

a conductive structure separated from the resonating element arm by a gap;

a tuning element having a first terminal, a second terminal, and a third terminal, the first terminal being coupled to the conductive structure;

a first conductive path that couples the first terminal to the resonating element arm;

a second conductive path that couples the resonating element arm to the antenna ground; and a third conductive path that couples the antenna ground to the third terminal.

18. The antenna of claim 17, wherein the second conductive path is coupled to a first point on the antenna ground and the third conductive path is coupled to a second point on the antenna ground that is separated from the first point.

19. The antenna of claim 17, wherein the first conductive path is coupled to a point on the resonating element arm and the second conductive path is coupled to the point on the resonating element arm.

20. The antenna of claim 17, wherein the tuning element comprises a single-pole three-throw (SP3T) switch.

* * * * *